(12) United States Patent
Rogalski

(10) Patent No.: US 7,437,767 B2
(45) Date of Patent: Oct. 14, 2008

(54) METHOD FOR ENABLING A TRUSTED DIALOG FOR COLLECTION OF SENSITIVE DATA

(75) Inventor: Mark Daniel Rogalski, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 862 days.

(21) Appl. No.: 10/981,253

(22) Filed: Nov. 4, 2004

(65) Prior Publication Data

US 2006/0095972 A1    May 4, 2006

(51) Int. Cl.
*G06F 21/00* (2006.01)

(52) U.S. Cl. .............. 726/26; 726/3; 726/16; 726/22; 726/27; 713/168; 713/176; 717/118; 717/166

(58) Field of Classification Search .............. None
See application file for complete search history.

(56) References Cited

U.S. PATENT DOCUMENTS

| | | | | |
|---|---|---|---|---|
| 5,841,869 | A | 11/1998 | Merkling et al. | 380/25 |
| 6,338,138 | B1 * | 1/2002 | Raduchel et al. | 713/155 |
| 7,100,049 | B2 * | 8/2006 | Gasparini et al. | 713/170 |
| 7,269,852 | B2 * | 9/2007 | Uemura et al. | 726/26 |
| 2001/0003842 | A1 | 6/2001 | Schaeck et al. | 713/169 |
| 2002/0066039 | A1 | 5/2002 | Dent | |
| 2003/0079039 | A1 | 4/2003 | Forkner et al. | 709/237 |

FOREIGN PATENT DOCUMENTS

CN    1298512    6/2001

OTHER PUBLICATIONS

Gong et al., "Going Beyond the Sandbox: An Overivew of the New Security Architecture in the Java Development Kit 1.2", 1997, Retrieved from the Internet on May 4, 2008, URL: <http://citeseer.ist.psu.edu/cache/papers/cs/7288/http:zSzzSzjava.sun.comzSzpeoplezSzgongzSzpaperszSzjdk12arch.pdf/gong97going.pdf>.*

Gong, "Secure Java Class Loading", 1998, Retrieved from the Internet on May 6, 2008, URL: <http://ieeexplore.ieee.org/iel4/4236/15853/00735987.pdf>.*

Wallach et al, "Understanding Java Stack Inspection", 1998, Retirieved from the Internet on May 4, 2008, URL: <http://www.cs.princeton.edu/sip/pub/oakland98.pdf>.*

* cited by examiner

*Primary Examiner*—Gilberto Barron, Jr.
*Assistant Examiner*—Minh Dinh
(74) *Attorney, Agent, or Firm*—Mark S. Walker; Suiter Swantz pc llo

(57) ABSTRACT

The present invention is a method for enabling a trusted dialog for collection of sensitive data, including the steps of: storing a personal security token specified by a user; receiving an input dialog request from an application; determining whether the application is a signed application; and, if a determination is made that the application is a signed application, accessing the personal security token and allowing the input dialog to be displayed with the personal security token and signed application identification.

1 Claim, 2 Drawing Sheets

METHOD FOR ENABLING A TRUSTED DIALOG FOR COLLECTION OF SENSITIVE DATA

FIELD OF THE INVENTION

The present invention relates to the field of computing and particularly to a method and program for enabling a trusted dialog for collection of sensitive data.

BACKGROUND OF THE INVENTION

Computing devices are being utilized to perform an ever-increasing number of tasks, some of which involve a user entering and/or storing private or sensitive data, such as when performing online banking transactions, making an online purchase or monitoring personal finances. Consequently, protection of such data from exploitation is becoming an increasingly important issue. On many software platforms, users are allowed to install software. This is problematic in that a user may unintentionally install a rogue application, which can compromise the security of both the software platform and the user's sensitive data. To some extent, such applications can be "sandboxed" to prevent them from accessing certain data and resources. However, by their very nature, rogue applications are almost always given access to a display of the computing device. This presents the potential problem of a rogue application spoofing the appearance of a legitimate or trusted application and soliciting sensitive data from a user, such as passwords or credit card numbers, which can then be exploited.

Therefore, it would be advantageous to have a method for enabling a trusted dialog for collection of sensitive data, which allows a user to have increased confidence that any input data is being collected by an application with a legitimate need for such data.

SUMMARY OF THE INVENTION

Accordingly, the present invention is directed to a method for enabling a trusted dialog for collection of sensitive data, which includes the steps of: storing a personal security token specified by a user; receiving an input dialog request from an application; determining whether the application is a signed application; and, if the application is a signed application, accessing the personal security token and allowing the input dialog to be displayed with the personal security token and signed application identification.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
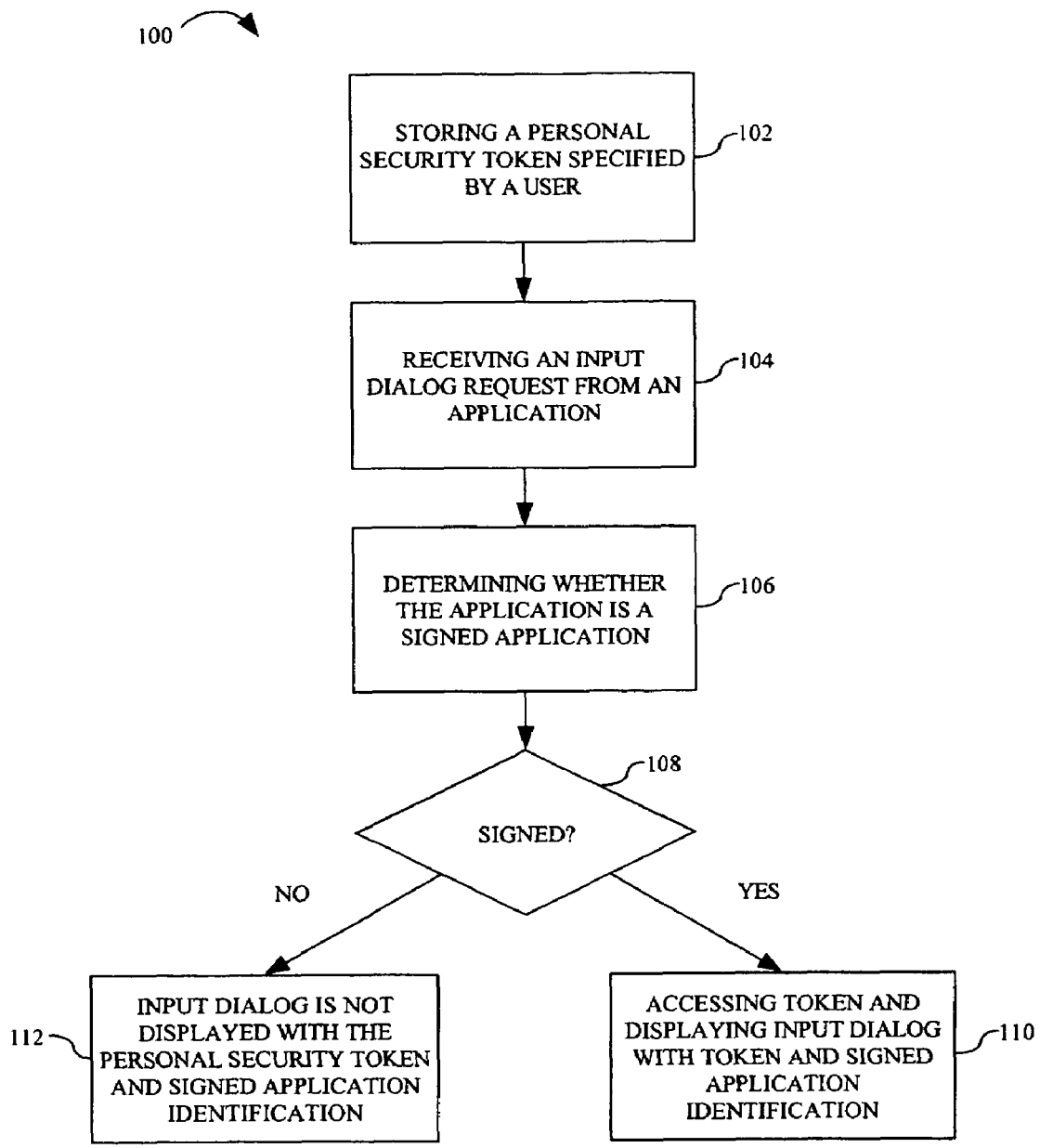
FIG. 1 is a flowchart illustrating a method for enabling a trusted dialog for collection of sensitive data in accordance with an exemplary embodiment of the present invention.
Figure 2:
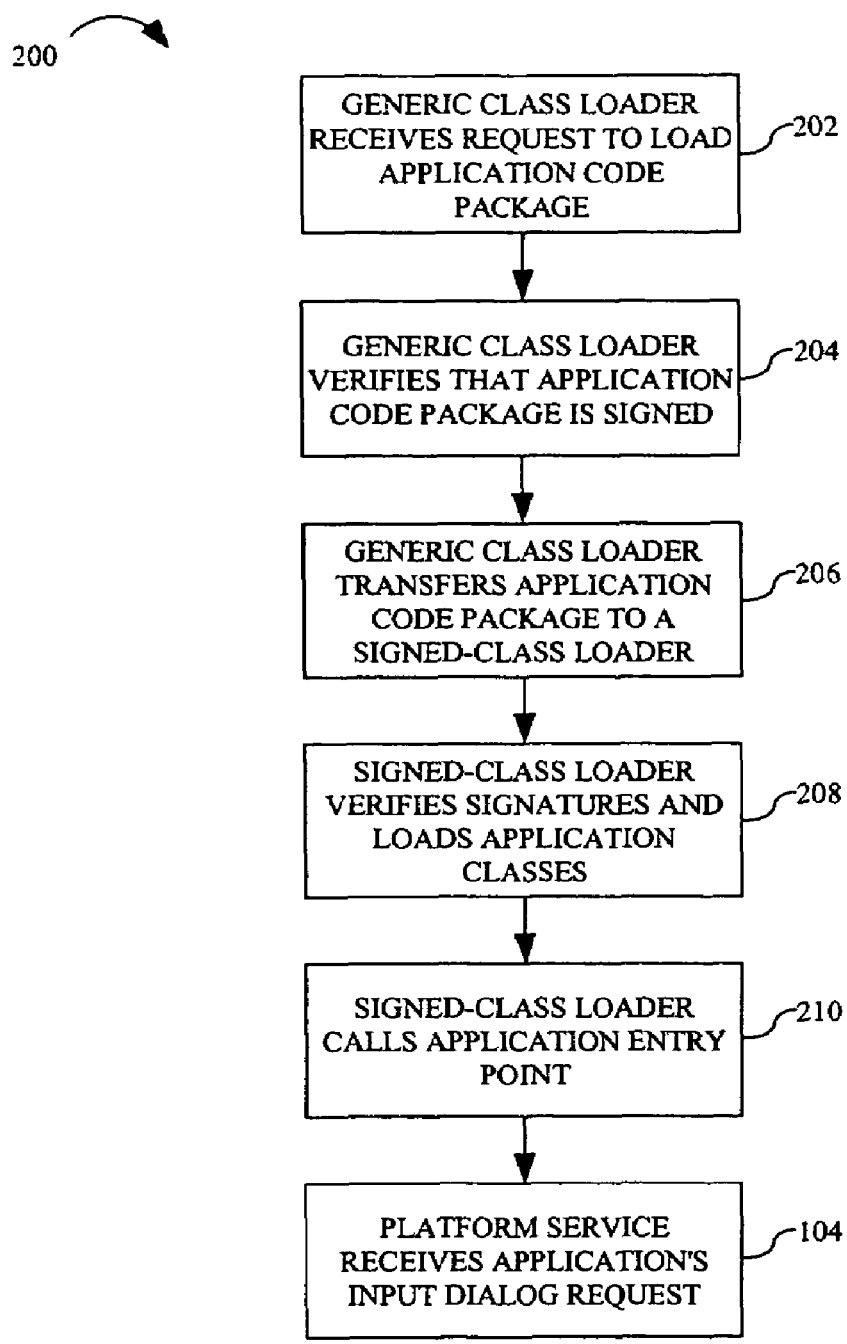
FIG. 2 is a flowchart illustrating a method for enabling a trusted dialog for collection of sensitive data in accordance with an exemplary embodiment of the present invention, in particular, the steps by which a platform service receives an input dialog request when a signed application places a call to the platform service via a class path. It is contemplated by the present invention that a number of methods are known in the art by which a platform service may be called.

Referring generally to FIGS. 1 and 2, a method for enabling a trusted dialog for collection of sensitive data in accordance with an embodiment of the present invention is discussed. The method 100 includes storing a personal security token specified by a user 102. In a present embodiment, a user of a computing device, such as a personal computer, PDA and the like, during initial setup/login, is asked by the software platform of the computing device to enter or select a personal security token. For example, the software platform may cause a message or prompt to be generated and displayed on a display screen of the user's computing device asking the user to enter a personal security token. The personal security token is selected by the user, via keyboard or mouse entry, and is stored by a platform service in a memory of the user's computing device 102. In a further embodiment, the personal security token is stored by a platform service in a memory of a remotely located computing device. In a present embodiment, the platform service is software implemented within the operating system of a user's computing device. In a further embodiment, the platform service software may be obtained and implemented within a user's computing device as an add-on feature. In an embodiment, the personal security token is an image or a portion thereof. For example, the image may be 32×32 or 16×16 pixels. In a further embodiment, the personal security token is a user-entered alpha/numeric character string. In additional embodiments, the personal security token may be changed as desired by the user.

The method 100 further includes receiving an input dialog request from an application 104. An input dialog is a message or prompt which appears on a display screen of a user's computing device and solicits a user response. For example, an input dialog may ask a user to input sensitive data, such as a password or a credit card number to be used by a corresponding application. If the corresponding application is a trusted application with a legitimate need for such data, a user can feel secure when providing information in response to that application's input dialog. However, in some cases, an input dialog may come from a rogue (i.e.—untrustworthy) application that has been installed, perhaps unintentionally, by the user. Rogue applications may generate an input dialog that spoofs the appearance of an input dialog from a trusted application. Consequently, a user may be deceived into providing sensitive data in response to a rogue application's input dialog, thus allowing for possible exploitation of such data. In a present embodiment, a platform service, such as a secure dialog service, receives an input dialog request from an application 104 which is attempting to have its input dialog displayed on a display screen of a user's computing device. In a present embodiment, the user's computing device contains a Java Virtual Machine (JVM) and the platform service receives the input dialog request from an application, which places a call to the platform service via a class path.

FIG. 2 illustrates a method 200 in accordance with the present embodiment of the invention, in particular, the steps by which a platform service receives an input dialog request when a signed application (i.e.-an application containing a digital signature) places a call to the platform service via a class path. First, a generic class loader of the JVM receives a request to load application code package 202. The generic class loader then verifies that the application code package is signed 204. The generic class loader transfers the application code package to a signed-class loader 206. The signed-class loader verifies the presence of proper certificate signatures and loads application classes 208. The signed-class loader then calls application entry point 210, which causes an execution call stack of the application to show the signed-class loader as the root of the call stack. Finally, the platform service receives the application's input dialog request 104.

Once an input dialog request from an application has been received 104, the method 100 further includes determining whether the application is a signed application 106. In a present embodiment, the platform service, upon receiving an input dialog request from an application, determines if the requesting application is a signed application 108. In the present embodiment, the platform service determines if the requesting application is a signed application by examining the application's execution call stack. If the execution call stack shows the signed-class loader as the root of the call stack, the platform service makes the determination that the application has been verified as a signed application and is thus, legitimate. The platform service operates under the assumption that a rogue application cannot spoof an execution call stack. If the platform service determines that the requesting application is signed 110, the platform service accesses the stored personal security token, which the requesting application does not know, and allows the application's input dialog to be displayed on a display of the user's computing device, the input dialog including the personal security token and the application's certificate information (i.e.-dialog origin information), which identifies the application as a signed application 110. A user seeing an input dialog on his or her computing device's display which includes the user's personal security token and the application's certificate information can be confident that the dialog is from the signed application identified in the dialog. Conversely, if the platform service determines that the application is not signed 112, the input dialog will not be displayed with the personal security token and will not include signed application identification.

It is important to note that while the present invention has been described as a method, those skilled in the art will appreciate that the method of the present invention is capable of being distributed in the form of a computer readable medium of instructions in a variety of forms, and that the present invention applies equally, regardless of the particular type of signal bearing media utilized to carry out the distribution. Examples of computer readable media include: non-volatile, hard-coded type media such as read only memories (ROMs) or erasable, electrically programmable read only memories (EEPROMs), recordable-type media such as floppy disks, hard disk drives and CD-ROMs and transmission-type media such as digital and analog communication links.

It is believed that the method of the present invention and many of its attendant advantages will be understood by the forgoing description. It is also believed that it will be apparent that various changes may be made in the form, construction and arrangement of the steps thereof without departing from the scope and spirit of the invention or without sacrificing all of its material advantages. The form herein before described being merely an explanatory embodiment thereof.

What is claimed is:

1. A method for enabling a trusted dialog for collection of sensitive data, comprising:

storing a personal security token selectably specified by a user, said security token being at least one of an image or an alpha/numeric character string, wherein said personal security token is stored by a platform service;

receiving an input dialog request from an application via said platform service;

determining whether the application is a signed application by inspecting said application's execution call stack; and determining that the application is a signed application if the execution call stack shows a signed class loader as the root of the call stack, accessing the personal security token and displaying the input dialog with the personal security token and signed application identification.

* * * * *